United States Patent [19]
Taguchi

[11] Patent Number: 5,515,134
[45] Date of Patent: May 7, 1996

[54] CAMERA POWER SOURCE SYSTEM

[75] Inventor: Fumiya Taguchi, Yokohama, Japan

[73] Assignee: Nikon Corporation, Tokyo, Japan

[21] Appl. No.: 354,866

[22] Filed: Dec. 9, 1994

[30] Foreign Application Priority Data

Dec. 10, 1993 [JP] Japan ................................. 5-341030

[51] Int. Cl.$^6$ ............................................... G03B 7/26
[52] U.S. Cl. ............................................................ 354/484
[58] Field of Search ................................... 354/468, 484

[56] References Cited

U.S. PATENT DOCUMENTS

| | | | |
|---|---|---|---|
| 4,324,468 | 4/1982 | Tano et al. | 354/484 |
| 4,384,776 | 5/1983 | Takami | 354/127.1 |

*Primary Examiner*—W. B. Perkey
*Attorney, Agent, or Firm*—Oliff & Berridge

[57] ABSTRACT

A power source system for a camera includes a primary power source, a secondary power source, a digital logic circuit and a reset circuit. The power source system includes a primary power source connection to connect the primary power source to the digital logic circuit and to the reset circuit, a secondary power source connection to connect the secondary power source to the reset circuit, and a power source that controls the primary and secondary power source in selectively supplying power to the reset circuit and the digital logic circuit. The power source system permits the digital logic circuit to be reset with certainty.

33 Claims, 8 Drawing Sheets

CAMERA POWER SOURCE SYSTEM

BACKGROUND OF THE INVENTION

1. Field of the Invention

The present invention relates to a power source system used in a camera, and in particular, to a power source system that permits a digital logic circuit within the camera to be reset consistently.

2. Description of Related Art

In cameras in general, a battery is used as a power source, and a DC/DC converter is used in order to supply power from this battery to circuit blocks in a consistent manner. In addition, a conventional camera includes digital circuits that process digital signals and analog circuits that process analog signals. Correspondingly, power source systems are also divided into analog power sources and digital power sources, depending on the type of signal processed. Typically, power for both the analog power source and the digital power source is output from a single DC/DC converter. Accordingly, the output of each source of power is turned on and off with the same timing.

Figure 6:
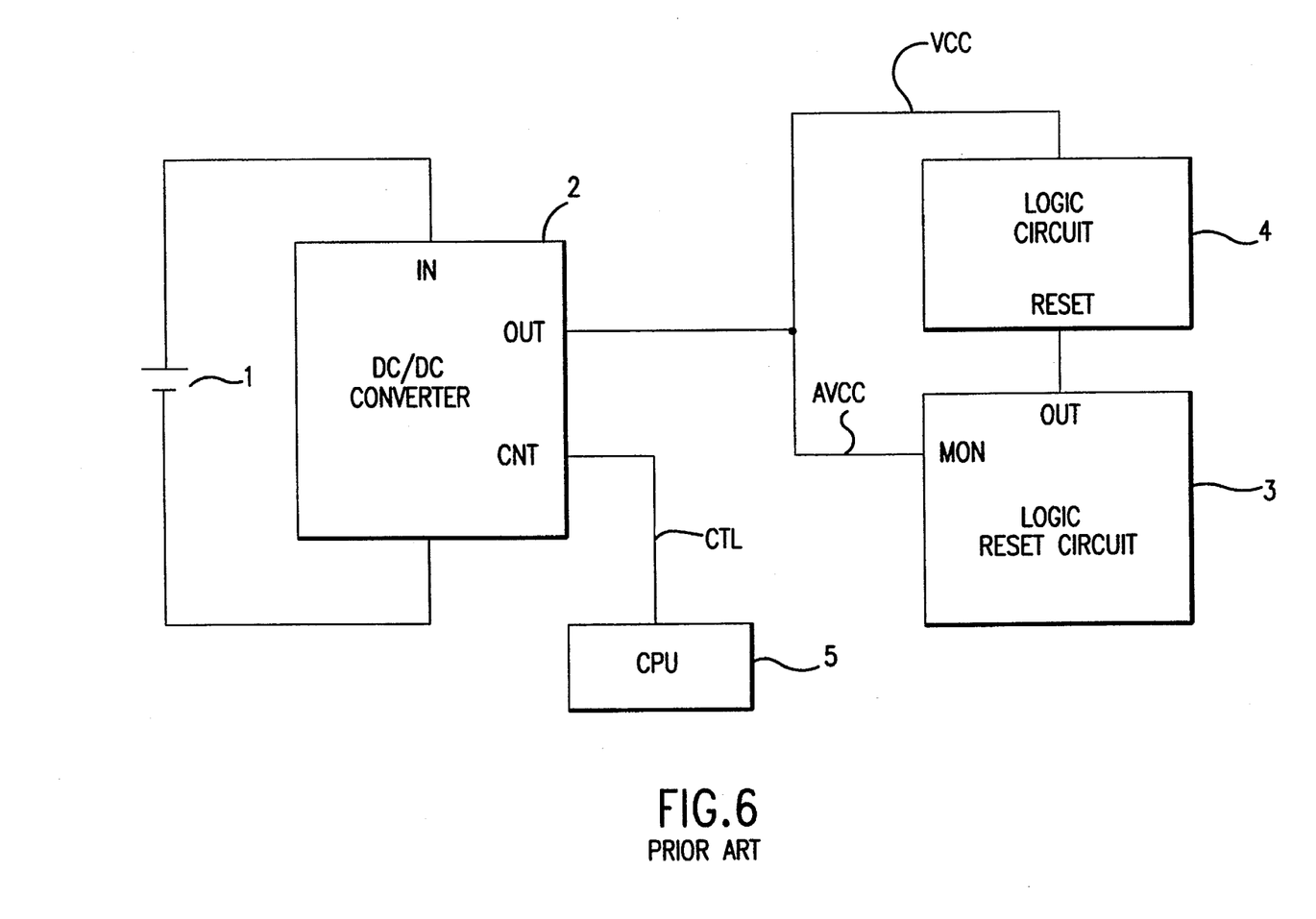
FIG. 6 is a block diagram showing an example of a conventional power source system.

FIG. 6 is a block diagram of such a conventional power source circuit. The FIG. 6 circuit includes a battery 1, a DC/DC converter 2, a logic reset circuit 3, a logic circuit 4 and a CPU 5.

When the battery 1 is installed in the camera, power is supplied to the CPU 5, and the CPU 5 enters an operating state. In this case, the CPU 5 outputs an "L" level control signal CTL to a control terminal CNT of the DC/DC converter 2 and starts the DC/DC converter 2. When this occurs, voltage is output from a 5 V output terminal OUT of the DC/DC converter 2. This power is supplied as VCC to the logic circuit 4 and as AVCC to the logic reset circuit 3 that resets the logic circuit 4.

Figures 7A, 7B:
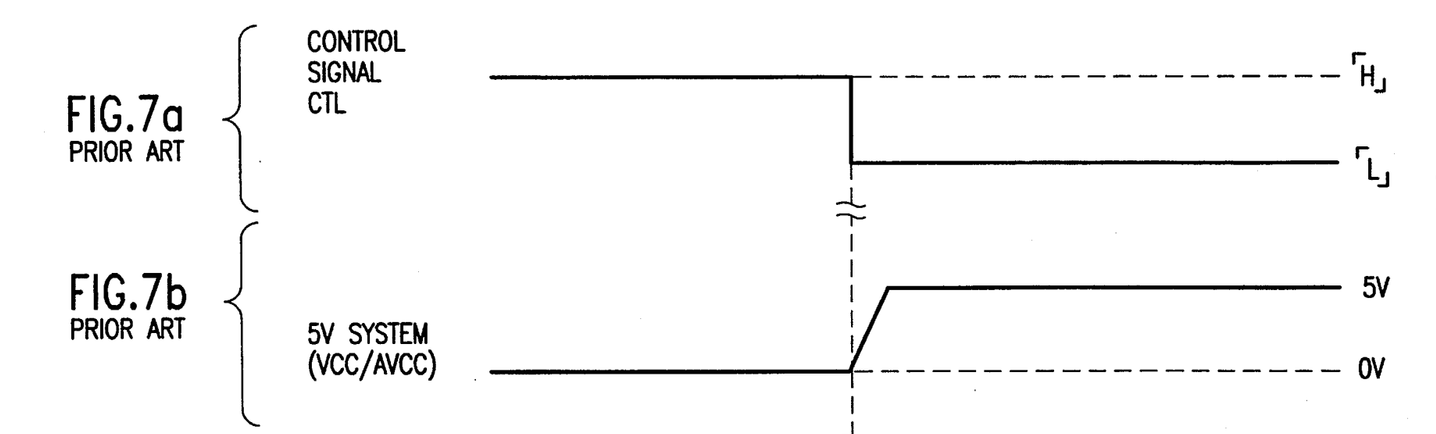
FIGS. 7a, 7b, and 7c are timing charts showing power source control in a prior art system.
Figure 7C:
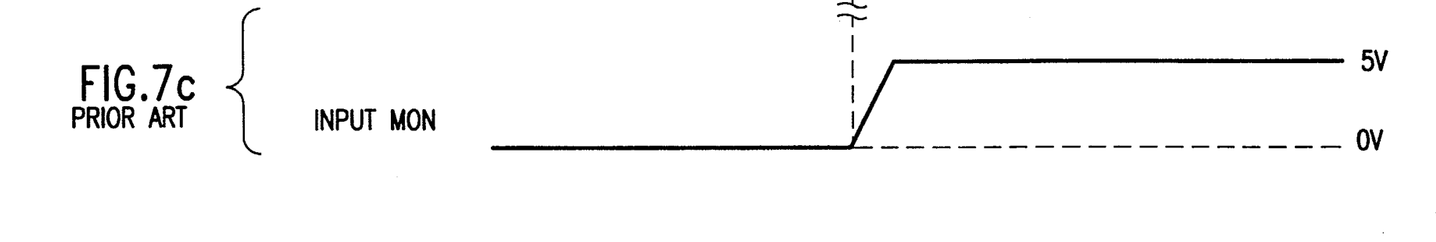

FIG. 7 is a drawing showing the voltage waveforms for each part of the power source system when battery power is supplied.

The analog-type logic reset circuit 3 resets the digital logic circuit 4. The logic reset circuit 3 receives the power supplied to the logic circuit 4 via a terminal MON. The logic circuit 4 is driven by a digital power source. Accordingly, the output of the logic reset circuit 3, which is an analog circuit, rises with the same timing as the power supplied to the logic circuit 4, which is a digital circuit. Consequently, when the power supplied to the logic circuit 4 is not constant, e.g., while the power level is rising, a proper reset condition cannot be maintained because the logic reset circuit 3 is receiving a non-constant signal. FIGS. 7b and 7c illustrate this problem by showing that the signal (FIG. 7c) received by logic reset circuit 3 varies with the signal output by DC/DC converter 2. Therefore, the logic system of the prior art cannot be initialized with certainty.

As a result, when the output level of the logic circuit 4 is the output wave form of a MOS open drain-type for instance, if the logic circuit 4 is initialized normally, the circuit should be in the OFF state (i.e., the default state). If the logic circuit 4 is not initialized normally, however, the transistors at the output level become ON, causing erroneous operations, e.g., sinking current.

SUMMARY OF THE INVENTION

Accordingly, it is an object of the present invention to ensure that a logic circuit (e.g., a digital circuit) in a camera is reset with certainty by a reset circuit (e.g., an analog circuit).

This and other objects are achieved by the camera power source system of the present invention. The camera includes a primary power source system, a secondary power source system, a digital logic circuit that performs various controls, and a reset circuit that resets the digital logic circuit. The power source system further includes a primary power source connection, a secondary power source connection and a power source control device.

The primary power source connection connects the primary power source system to the digital logic circuit and to the reset circuit. The primary power source connection supplies power to the digital logic circuit and to the reset circuit and causes a reset release voltage to be produced by the reset circuit, which is supplied to the digital logic circuit. The secondary power source connection connects the secondary power source system to the reset circuit. The secondary power source connection supplies power to the reset circuit and causes the reset circuit to produce a reset voltage, which is supplied to the logic circuit. The power source control device controls the secondary power source system to supply power to the reset circuit when power from the primary and secondary power source systems is not being supplied to the digital logic circuit and to the reset circuit. Once the power supply from the secondary power source system has stabilized, the power source control device controls the primary power source system to supply power to the digital logic circuit and to the reset circuit.

When it is desired to shut off power, the power source control device initially stops the supply of power from the primary power source system to the digital logic circuit and to the reset circuit when the primary and secondary power source systems are both supplying power to the digital logic circuit and to the reset circuit. Then, the power source control device stops the supply of power from the secondary power source system to the reset circuit, i.e., after the supply of power from the primary power source system is stopped.

The power source control device controls the secondary power source system such that the voltage input to the reset circuit is set between a primary voltage that moves the digital logic circuit from the operating state to the reset state and a secondary voltage that is the minimum voltage needed to maintain operation of the reset circuit.

The primary and secondary power source connections can be diodes, switches, or other devices that can be selectively activated to prevent the flow of power from the power source systems. Any of these types of devices can be controlled by the power source control device. The primary power source system can be a DC/DC converter. The secondary power source system can be a voltage regulator, a current source and a resistor, or a series of diodes. In addition, the primary and secondary power source systems can be configured as a constant voltage IC in which at least two voltages can be output independently.

When power from the primary and secondary power source systems is not supplied to the digital logic circuit and to the reset circuit, the secondary power source system is controlled to supply power to the reset circuit. Subsequently, the primary power source system is controlled to supply power to the digital logic circuit and to the reset circuit. As a result, when the power supply is rising, the digital logic circuit can be reset with certainty.

In addition, when power from the primary and secondary power source systems is supplied to the digital logic circuit and to the reset circuit, power supplied from the primary power source system to the digital logic circuit and to the reset circuit is stopped. Subsequently, power supplied from the secondary power source system to the reset circuit is stopped. As a result, the digital logic circuit can be reset with certainty even when the power supply is falling.

When the secondary power source system is controlled to supply power to the reset circuit causing a reset voltage to be produced, the voltage input into the reset circuit is set between a primary voltage that moves the digital logic circuit from an operating state to a reset state and a secondary voltage that is the minimum voltage needed to maintain operation of the reset circuit. As a result, the digital logic circuit can be reset with certainty.

BRIEF DESCRIPTION OF THE DRAWINGS

The invention will be described in conjunction with the following drawings in which like reference numerals designate like elements and wherein.

DETAILED DESCRIPTION OF PREFERRED EMBODIMENTS

Figure 1:
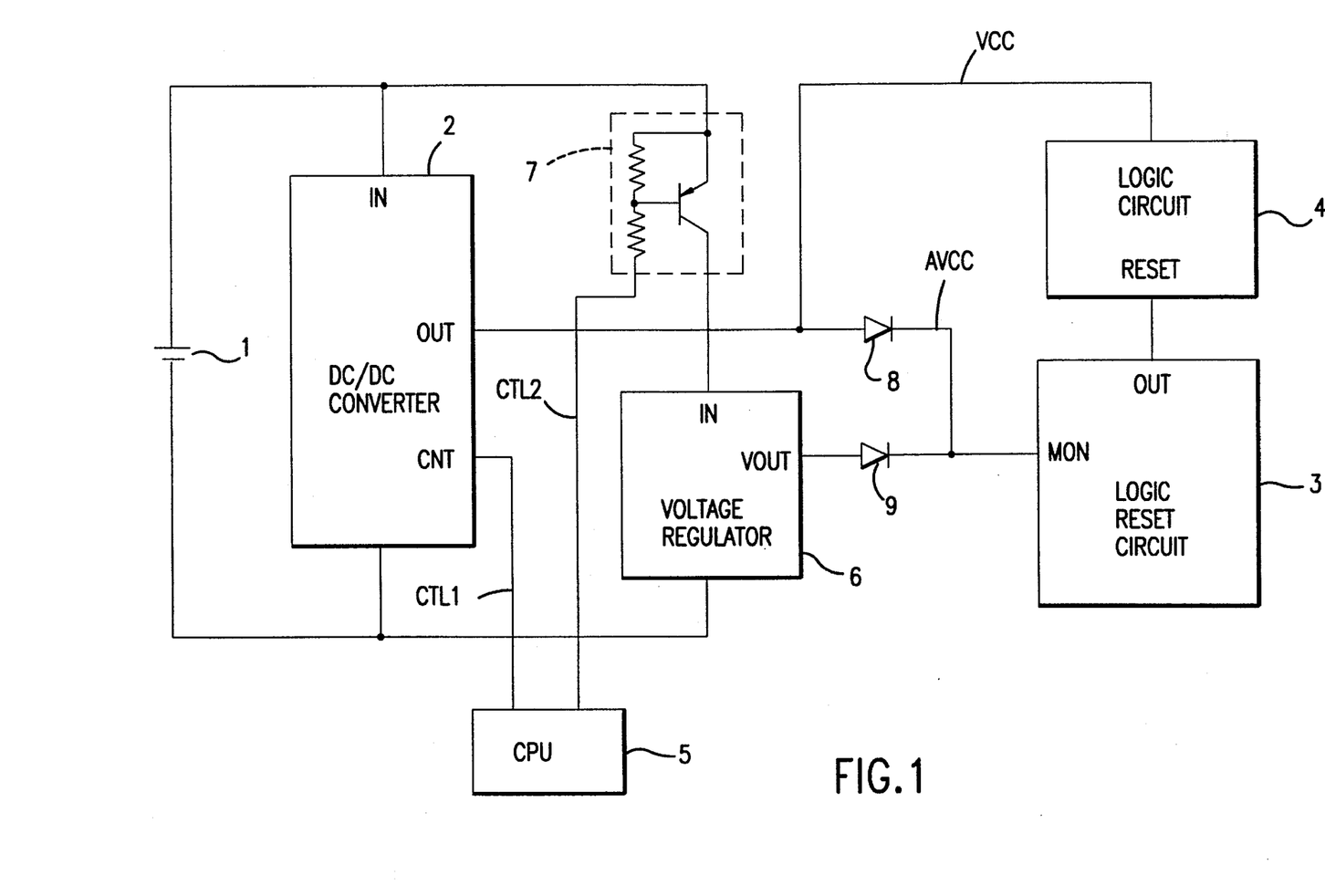
FIG. 1 is a block diagram showing an embodiment of the camera power source system according to the present invention.

FIG. 1 is a block diagram showing an embodiment of a power source system for a camera according to the present invention. The FIG. 1 power source system includes a battery 1, a DC/DC converter 2, a logic reset circuit 3, a logic circuit 4 that is reset by the logic reset circuit 3, a CPU 5, a voltage regulator 6, a transistor circuit 7, and diodes 8, 9 (e.g., Schottky diodes).

Cameras are generally provided with a separate circuit block for components that draw large amounts of current, including, e.g., the strobe circuit, the motor, and the magnets. In addition, a separate circuit block is usually provided for components to which a stable voltage must be applied, including, e.g., the CPU 5 and the EEPROM. High voltage components, including, e.g., the CCDs or ICs that drive the motor, are also configured in a separate circuit block. Each of these kinds of circuit blocks use the battery 1 as its fundamental power source.

Power is supplied directly from the battery to the circuit block that draws large amounts of current. Power is supplied from the 5 V output OUT of the DC/DC converter to the circuit block that requires stable voltage. Power to the circuit block that requires high voltage is supplied from the 12 V step-up system that can be connected to the DC/DC converter. When a voltage from the battery is supplied to the input IN of DC/DC converter 2, DC/DC converter 2 outputs a preset voltage when the control terminal CNT is controlled so as to be at a particular level, e.g., the "L" level.

The 5 V system, however, which withstands the largest current draw because it supplies voltage to the greatest number of components, is divided from the fundamental source into an analog system that processes analog signals and a digital system that processes digital signals. Consequently, when the DC/DC converter is started, the voltages of the circuit blocks in the analog system and in the digital system increase simultaneously.

When the digital system voltage and the analog system voltage increase simultaneously, a non-constant signal is output to the reset circuit 3. Because the voltage of the reset circuit 3 is increasing, it is impossible to maintain the appropriate reset state in this non-constant operating region. Consequently, the logic circuit 4 can operate erratically if power is being supplied to it before it has been initialized by the reset circuit 3.

In one embodiment of the present invention, as shown in FIG. 1, when the battery 1 is installed in the camera, power is supplied to the CPU 5 and the CPU 5 enters an operating state. The CPU 5 sets the control signal CTL2 that is used to control the transistor circuit 7 to the "L" level. When this occurs, power is supplied from the battery 1 to the voltage regulator 6 via transistor circuit 7. A preset voltage after the forward voltage drop across the diode 9 is output from the output terminal VOUT to the input terminal MON of the logic reset circuit 3. The preset voltage serves as a monitoring input and is at a level between the reset detection voltage and the minimum voltage needed for operating the logic circuit 3.

Figure 3A:
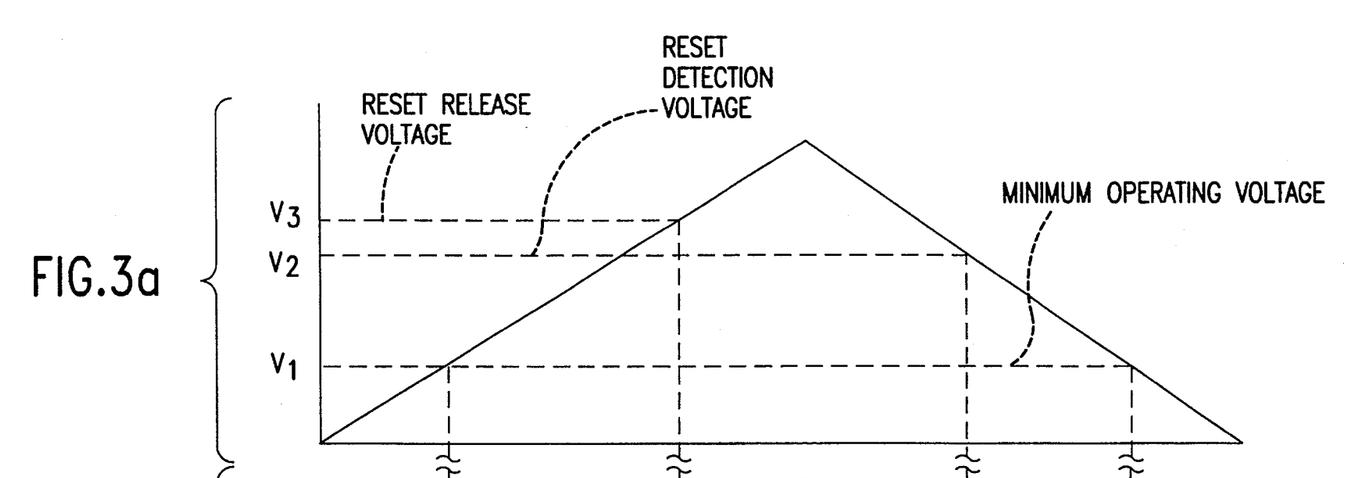
FIGS. 3a and 3b show the input and output characteristics of the reset circuit in the camera power source system.
Figure 3B:
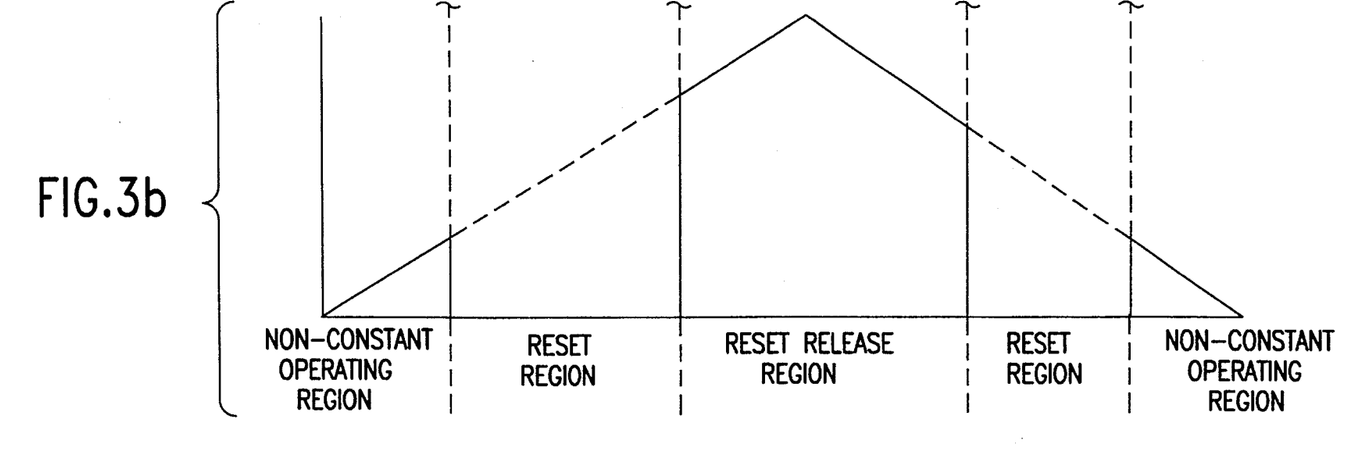

The input and output characteristics of the logic reset circuit 3 are shown in FIGS. 3a and 3b. When the voltage is below the minimum operating voltage V1 of the logic reset circuit 3, the circuit is in a non-constant operating region and a consistent output cannot be ensured. As the voltage increases from this state, the logic reset circuit 3 enters the operating region and outputs an "L" level signal as the reset output. When the input voltage increases further, the circuit outputs an "H" level reset release signal when the input reaches the reset release voltage V3. When the input voltage decreases from this state, an "L" level reset signal is output when the reset detection voltage V2 is reached. When the input voltage decreases further, the circuit enters the non-constant operating region upon reaching the minimum operating voltage V1 of the logic reset circuit 3.

In other words, as shown in FIG. 3b, when the voltage at the input terminal MON is below the minimum operating voltage V1, the reset circuit 3 is in a non-constant operating region. The reset circuit 3 enters the reset region as the voltage at the input terminal MON increases beyond the minimum operating voltage V1. When the voltage at the input terminal MON is raised further and reaches the reset release voltage V3, the circuit enters the reset release region. When the voltage decreases and reaches the reset detection voltage V2, the circuit again enters a reset region. As the voltage decreases further until it is below the minimum operating voltage, the circuit again enters a non-constant operating region.

Figure 4A:
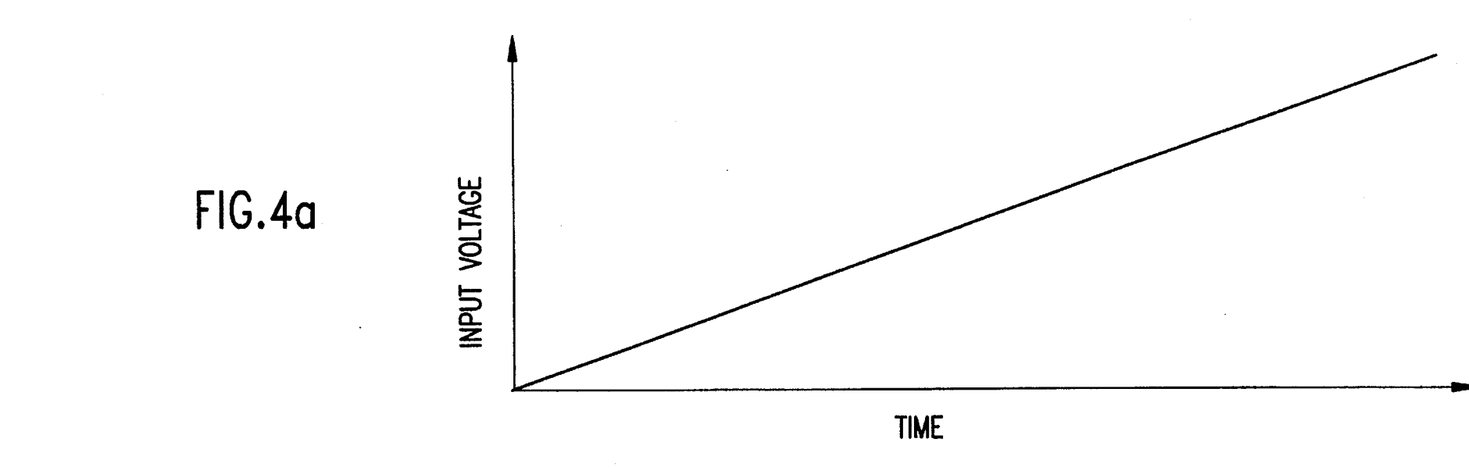
FIGS. 4a and 4b show the input and output characteristics of the voltage regulator in the camera power source system.
Figure 4B:
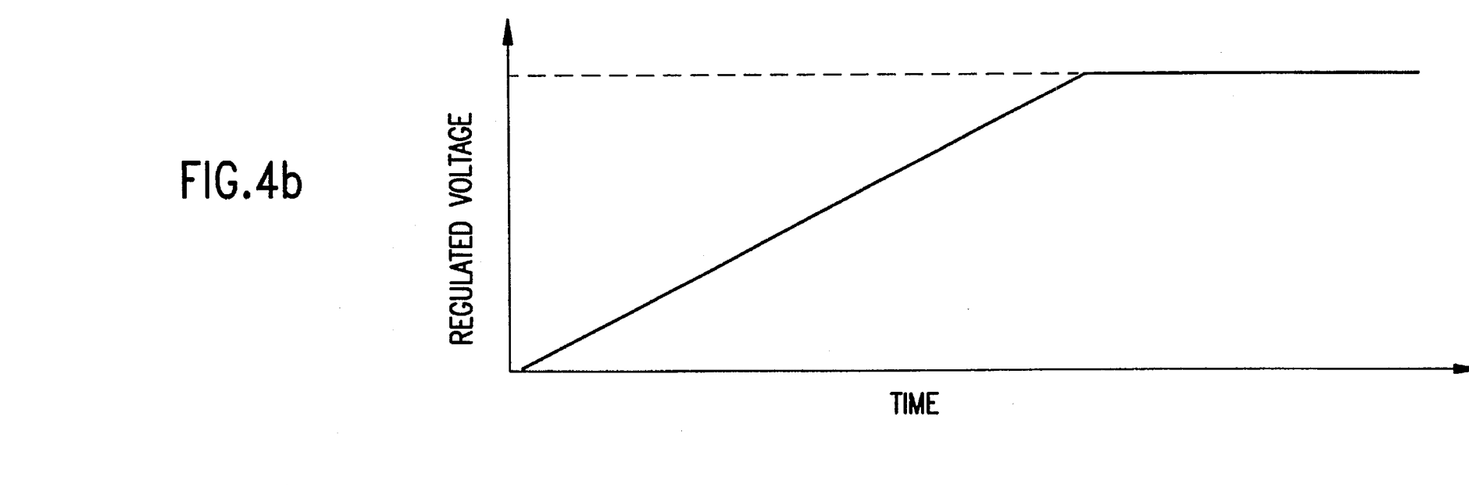

FIG. 4b shows the output voltage characteristic of the voltage regulator 6, the output voltage being supplied to the logic reset circuit 3, relative to the input voltage characteristic shown in FIG. 4a. When the voltage regulator 6 receives an input voltage on the input terminal IN exceeding a prescribed output voltage, a regulated voltage is output, as shown in FIG. 4b. When the input voltage does not exceed the prescribed output voltage (i.e., an input voltage that is less than the prescribed output voltage) is received at input terminal IN, an unregulated voltage is output, which corresponds to the input voltage.

As one example of the present embodiment, the minimum operating voltage (V1) of the logic reset circuit 3 is set at a maximum of 2.1 V, the reset detection voltage (V2) is set at a minimum of 3.7 V, the prescribed output voltage of the voltage regulator 6 is set at 3 V, the input voltage is from a 6 V lithium battery, and the forward voltage drop across the Schottky diode 9 is a maximum of 0.4 V. With these settings, when the output of the voltage regulator 6 is turned on, an input voltage is impressed on the input terminal MON of the logic reset circuit 3 that is greater than the minimum operating voltage of the logic reset circuit but less than the reset detection voltage.

Under these conditions, a voltage that exceeds the non-constant operating region voltage (V1) of the reset circuit 3 is impressed on the input terminal MON of the logic reset circuit 3 while the reset condition is maintained. In addition, no voltage is output from the output terminal OUT of the DC/DC converter 2 at this time. Accordingly, because no power is supplied to the logic circuit 4, no erroneous operations occur due to instability of the reset signal.

When this state occurs, the CPU 5 sends an "L" level control signal CTL1 to the control terminal CNT of the DC/DC converter 2. When this occurs, voltage is output from the 5 V output terminal OUT of the DC/DC converter 2. This voltage is supplied to the logic circuit 4 as VCC and to the logic reset circuit 3 as AVCC. As a result, the logic circuit 4 is initialized by being reset by an output signal from the output terminal OUT of the logic reset circuit 3. The reset condition is subsequently released by the impressing of the power supply AVCC to the input terminal MON of logic reset circuit 3 as detailed below. The DC/DC converter 2 can be initialized irrespective of the state of the voltage regulator 6. In other words, the DC/DC converter 2 can be initialized if the voltage regulator 6 is on or if it is off.

Figure 2A:
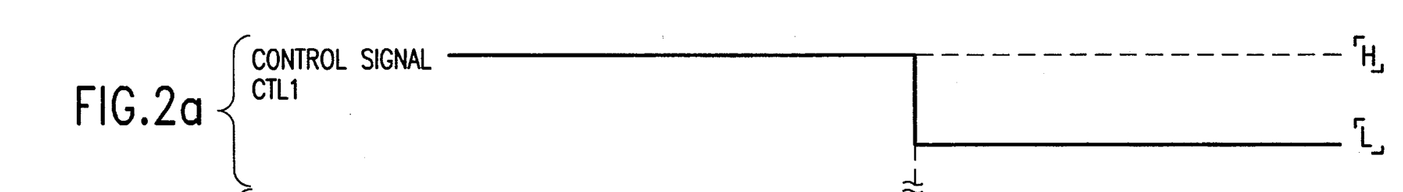
FIGS. 2a, 2b, 2c, 2d and 2e are timing charts showing the power source control in the camera power source system.
Figure 2B:
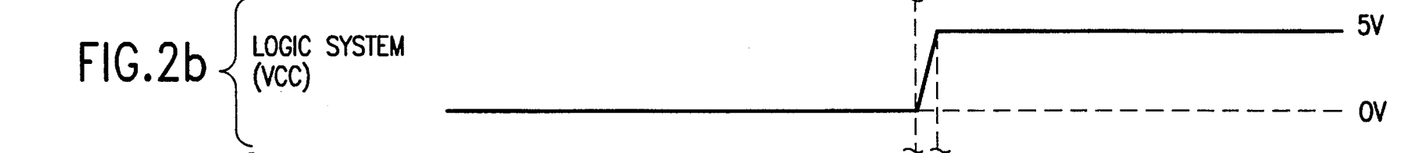
Figure 2C:
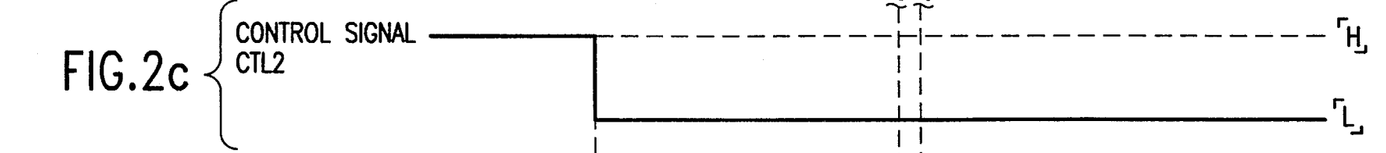
Figure 2D:
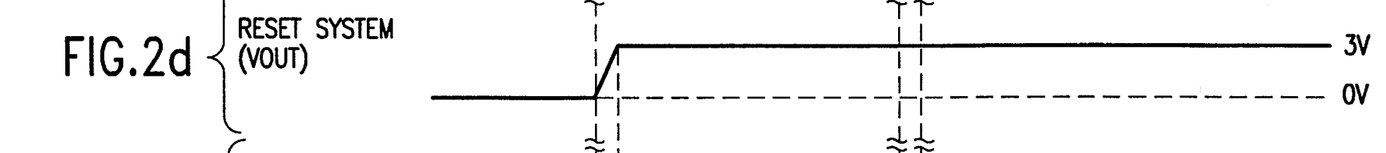
Figure 2E:
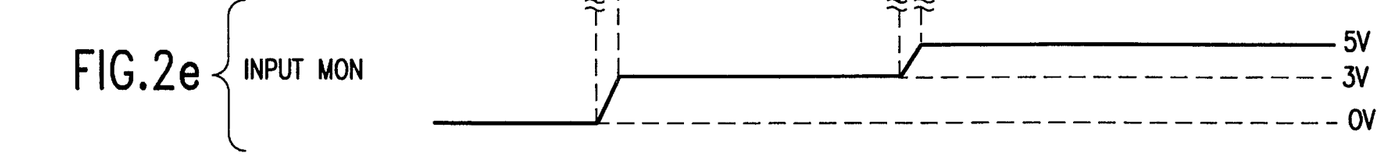

FIGS. 2a through 2e are timing charts showing the timing of the operations of the various parts of the system of the present embodiment that perform the functions described above. When power is supplied from the battery 1, the CPU 5 first sets the control signal CTL2 to the "L" level (FIG. 2c). When this occurs, voltage is output from the voltage regulator 6, which is the power source for the reset system (i.e., the logic reset circuit 3) (FIG. 2d). The voltage from the voltage regulator 6 is supplied to the input terminal MON of the logic reset circuit 3 so that an "L" level reset signal (i.e., the reset signal) can be output (FIG. 2e). Subsequently, the CPU 5 sets the control signal CTL1 to the "L" level, which starts the DC/DC converter 2 (FIG. 2a). As a result, power is supplied to the logic circuit 4 as VCC (FIG. 2b) while power is supplied to the logic reset circuit 3 as AVCC, and a "H" level reset release signal (i.e., the reset release signal) is output by logic reset circuit 3 to the logic circuit 4 (FIG. 2e).

In this manner, when the DC/DC converter 2 is initialized immediately after the battery 1 has been installed, the initialization of the DC/DC converter 2 occurs after the initialization of the voltage regulator 6. This enables the logic reset circuit 3 to output the reset signal before power is supplied to logic circuit 4, thereby preventing the erroneous operations that would result if the logic circuit 4 had not been initialized prior to receiving power. When the DC/DC converter is initialized at times other than immediately after the battery 1 is installed, the various parts are initialized in the same sequence.

When there is no key input from outside the camera after the DC/DC converter 2 has been initialized, the CPU 5 turns the DC/DC converter 2 off in order to reduce power consumption. In this case, the CPU 5 first verifies whether the control signal CLT2 is at the "L" low level. If the control signal CTL2 is at the "H" level, it is set to the "L" level, the transistor circuit 7 is turned on, and the voltage regulator 6 is started. Subsequently, the control signal CTL1 is returned to the "H" level and the DC/DC converter 2 is deactivated. After the DC/DC converter 2 has been deactivated, the control signal CTL2 is set to the "H" level to turn off the voltage regulator 6. This control sequence prevents erroneous operations in the logic circuit from occurring when the DC/DC converter 2 is turned off.

The power source system uses a voltage regulator 6 that outputs a voltage within the range between the reset detection voltage (V2) and the minimum operating voltage (V1) of the reset circuit 3. Of the lines that branch from the output of the DC/DC converter 2 and supply power to the analog system and to the digital system, the output of the voltage regulator 6 is taken from the DC/DC converter analog system line output and the diode 9 immediately prior to the analog power supply line that is monitored by the reset circuit 3. In addition, the timing of the start up of the DC/DC converter 2 and the initialization of the voltage regulator 6 is set such that the DC/DC converter 2 is initialized after the voltage regulator 6 has been initialized and its output is stabilized.

As a result, the control is executed such that the logic circuit power source is at 0 V when the reset circuit 3 has a non-constant voltage. Therefore, it is possible to eliminate problems caused by erroneous operation of the logic circuit 4 when the power supply is rising.

With the present embodiment, the power supplied from the DC/DC converter 2 and the voltage regulator 6 passes through the diodes 8, 9 when power is supplied to the logic reset circuit 3. Alternatively, the power can pass through switches disposed in place of the diodes 8, 9. The CPU 5 can control each switch based on the sequence described above.

Figure 5A:
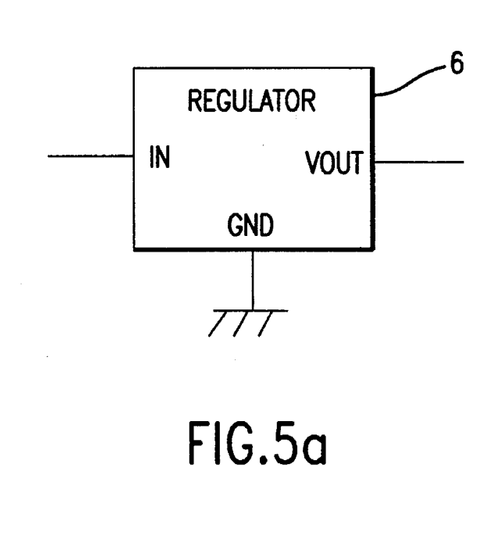
FIGS. 5a, 5b and 5c show other embodiments of the voltage regulator in the above system.
Figure 5B:
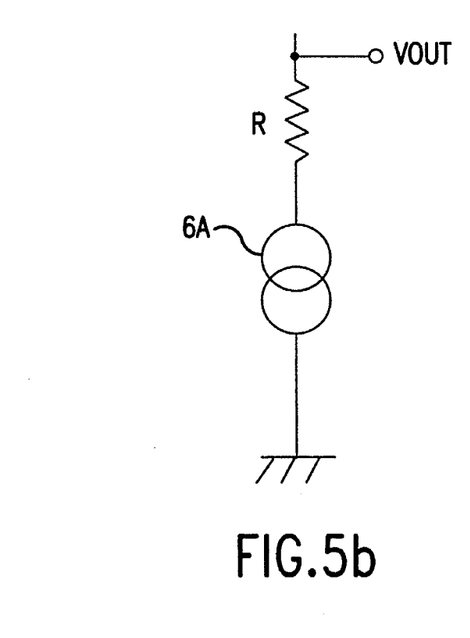
Figure 5C:
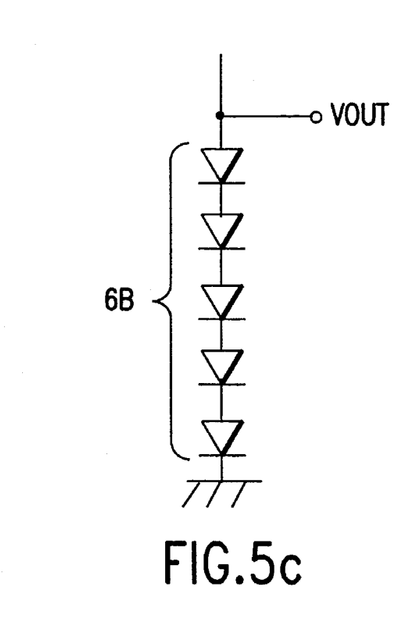

Although the voltage regulator 6 of the preferred embodiment is a three terminal regulator as shown in FIG. 5a, the same results can be achieved if a resistor R and a constant-current source 6A, as shown in FIG. 5b, are substituted for the voltage regulator 6. Alternatively, a constant-voltage source 6B comprised of a plurality of diodes connected in series can be substituted for the voltage regulator 6. In FIG. 5c, five such diodes are shown.

Figure 8:
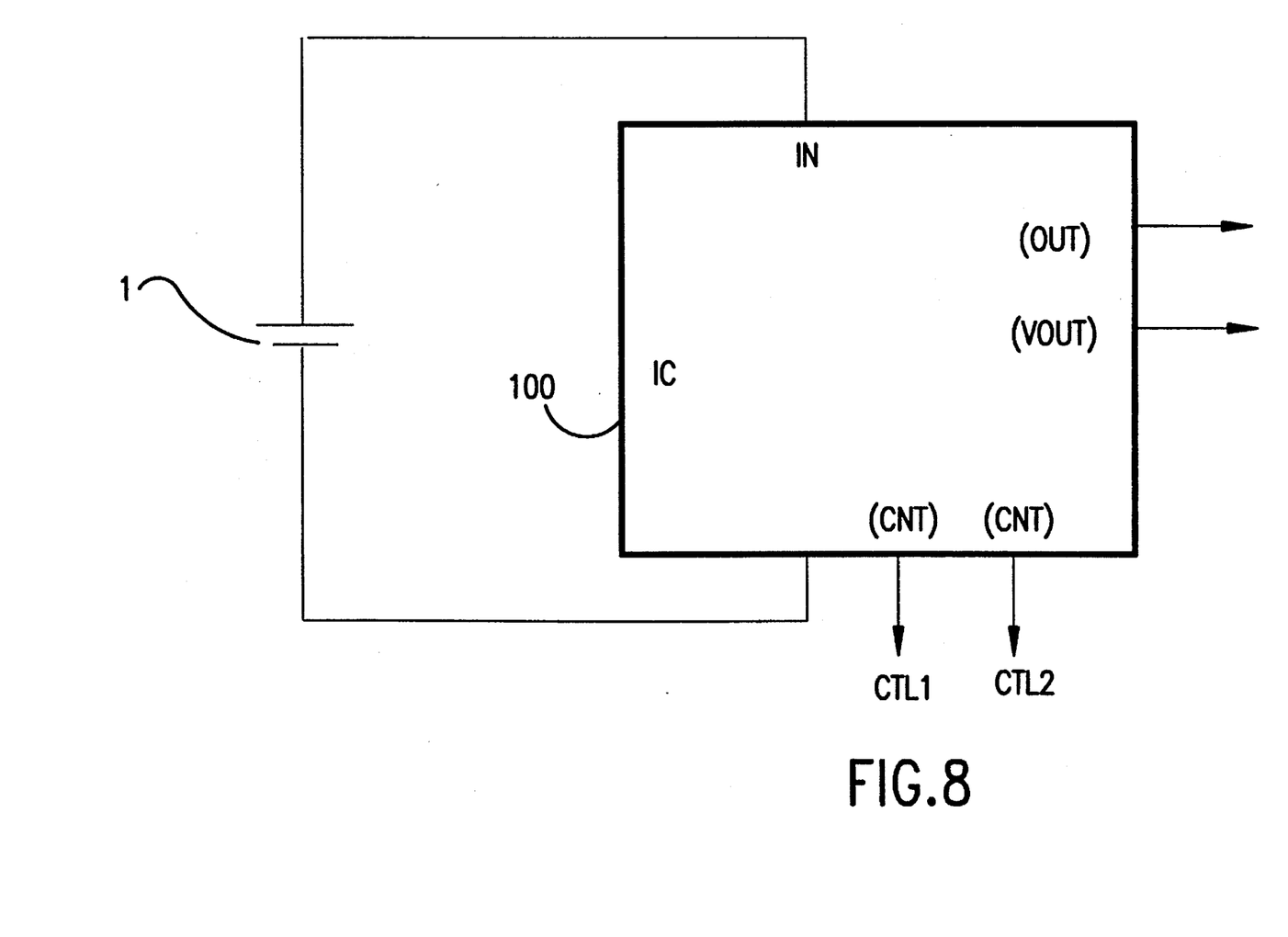
FIG. 8 is a partial block diagram showing an alternative embodiment of the camera power source system that includes an integrated circuit to encompass the functions of the DC/DC converter and the voltage regulator shown in FIG. 1.

As shown in FIG. 8, a constant-voltage integrated circuit (IC) 100 from which two sources of power can be output independently can be used in place of both the DC/DC converter 2 and the voltage regulator 6. The IC 100 receives control signals CTL1 and CTL2 from the CPU 5. The IC 100 includes a VOUT terminal that is connected to the logic reset circuit 3 to function similar to the VOUT terminal of the voltage regulator 6. The IC 100 also includes an OUT terminal that is connected to the logic circuit 4 to function similar to the OUT terminal of the DC/DC converter 2. The IC 100 is supplied with voltage from the battery 1 via an input terminal IN.

With the present invention, when power from the primary power source is supplied to the digital logic circuit and to the reset circuit through the primary power supply connection and power from the secondary power source is supplied to the reset circuit via the secondary power source connection, if power from the primary and secondary power sources is not supplied to the digital logic circuit and to the reset circuit, the secondary power source system is controlled to supply power to the reset circuit. Subsequently, the primary power source system is controlled to supply power to the digital logic circuit and the reset circuit, and as a result, during initialization of the power source, the digital logic circuit can be reset with certainty.

In addition, when power from both the primary and secondary power sources is supplied to the digital logic circuit and the reset circuit, and it is desired to shut off the supply of power, initially the power supplied from the primary power source system to the digital logic circuit and to the reset circuit is stopped. Subsequently, the power supplied from the secondary power source system to the reset circuit is stopped, and as a result, the digital logic circuit can be reset with certainty even when the power supply is falling.

When the secondary power source system is controlled to supply power to the reset circuit causing a reset voltage to be produced, the voltage input into the reset circuit is set between a first voltage that moves the digital logic circuit from an operating state to a reset state and a second voltage that is the minimum voltage needed to maintain operation of the reset circuit. As a result, the digital logic circuit can be reset with certainty.

While this invention has been described in conjunction with specific embodiments thereof, it is evident that many alternatives, modifications and variations will be apparent to those skilled in the art. Accordingly, the preferred embodiments of the invention as set forth herein are intended to be illustrative, not limiting. Various changes may be made without departing from the spirit and scope of the invention as defined in the following claims.

What is claimed is:

1. A power source system for a camera having a primary power source, a secondary power source, a digital logic circuit and a reset circuit coupled to the digital logic circuit, said power source system comprising:

primary power source connection means for connecting said primary power source to said digital logic circuit and to said reset circuit, said primary power source causing said reset circuit to output a reset release signal to said digital logic circuit when connected to said reset circuit;

secondary power source connection means for connecting said secondary power source to said reset circuit, said secondary power source causing said reset circuit to output a reset signal to said digital logic circuit when connected to said reset circuit; and power source control means for controlling said primary power source and said secondary power source for selectively supplying power to said reset circuit.

2. The power source system of claim 1, wherein at an initial power-up time, said power source control means initially controls said secondary power source to supply power to said reset circuit so that said reset circuit outputs said reset signal to said digital logic circuit, while preventing said primary power source from supplying power to said digital logic circuit and to said reset circuit.

3. The power source system of claim 2, wherein after said reset circuit outputs said reset signal, said power source control means controls said primary power source to supply power to said digital logic circuit and to said reset circuit.

4. The power source system of claim 1, wherein during a power-down sequence, said power source control means initially stops said primary power source from supplying power to said digital logic circuit and to said reset circuit while permitting said secondary power source to supply power to said reset circuit.

5. The power source system of claim 4, wherein said power source control means stops said secondary power source from supplying power to said reset circuit after stopping said primary power source from supplying power to said digital logic circuit and to said reset circuit.

6. The power source system of claim 4, wherein said power source control means causes said secondary power source to supply power to said reset circuit prior to stopping said primary power source from supplying power when said secondary power source is not supplying power to said reset circuit.

7. The power source system of claim 1, wherein at least one of said primary power source connection means and said secondary power source connection means includes a diode.

8. The power source system of claim 1, wherein said primary power source includes a DC/DC converter.

9. The power source system of claim 1, wherein said secondary power source includes a voltage regulator.

10. The power source system of claim 1, wherein said secondary power source includes a current source and a resistor.

11. The power source system of claim 1, wherein said secondary power source includes at least one diode.

12. The power source system of claim 1, wherein said primary power source and said secondary power source include a constant-voltage integrated circuit.

13. The power source system of claim 12, wherein said constant-voltage integrated circuit outputs two voltages, each of said two voltages being independent of the other.

14. The power source system of claim 1, wherein an input voltage input to said reset circuit by said secondary power source is predetermined to be in a range from a first voltage to a second voltage, said first voltage being a voltage that causes said digital logic circuit to change from an operating state to a reset state, said second voltage being a minimum voltage necessary to operate said reset circuit.

15. A power source system for a camera having a primary power source, a secondary power source, a digital logic circuit, and a reset circuit that resets the digital logic circuit, said power source system comprising:

a primary power source connection that connects said primary power source to said digital logic circuit and to said reset circuit, said primary power source causing said reset circuit to output a reset release signal to said digital logic circuit when connected to said reset circuit;

a secondary power source connection that connects said secondary power source to said reset circuit, said secondary power source causing said reset circuit to output a reset signal to said digital logic circuit when connected to said reset circuit;

a power source control device that controls said primary power source and said secondary power source to selectively supply power to said reset circuit.

16. The power source system of claim 15, wherein at an initial power-up time, said power source control device initially controls said secondary power source to supply power to said reset circuit so that said reset circuit outputs said reset signal to said digital logic circuit, while preventing said primary power source from supplying power to said digital logic circuit and to said reset circuit.

17. The power source system of claim 16, wherein after said reset circuit outputs said reset signal, said power source control device controls said primary power source to supply power to said digital logic circuit and to said reset circuit.

18. The power source system of claim 15, wherein during a power-down sequence said power source control device initially stops said primary power source from supplying power to said digital logic circuit and to said reset circuit while permitting said secondary power source to supply power to said reset circuit.

19. The power source system of claim 18, wherein said power source control device stops said secondary power source from supplying power to said reset circuit after stopping said primary power source from supplying power to said digital logic circuit and to said reset circuit.

20. The power source system of claim 18, wherein said power source control device causes said secondary power source to supply power to said reset circuit prior to stopping said primary power source from supplying power when said secondary power source is not supplying power to said reset circuit.

21. The power source system of claim 15, wherein at least one of said primary power source connection and said secondary power source connection includes a diode.

22. The power source system of claim 15, wherein said primary power source includes a DC/DC converter.

23. The power source system of claim 15, wherein said secondary power source includes a voltage regulator.

24. The power source system of claim 15, wherein said secondary power source includes a current source and a resistor.

25. The power source system of claim 15, wherein said secondary power source includes at least one diode.

26. The power source system of claim 15, wherein said primary power source and said secondary power source include a constant-voltage integrated circuit.

27. The power source system of claim 26, wherein said constant-voltage integrated circuit outputs two voltages, each of said two voltages being independent of the other.

28. The power source system of claim 15, wherein an input voltage input to said reset circuit by said secondary power source is predetermined to be in a range from a first voltage to a second voltage, said first voltage being a voltage that causes said digital logic circuit to change from an operating state to a reset state, said second voltage being a minimum voltage necessary to operate said reset circuit.

29. A method of controlling a camera, said camera having a digital logic circuit, a reset circuit coupled to the digital logic circuit, a primary power source connected to said digital logic circuit and to said reset circuit, a secondary power source connected to said reset circuit, and a power source control device that controls said primary and said secondary power sources, said method comprising the step of:

selectively controlling said primary power source and said secondary power source with said power source control device so that said digital logic circuit only receives power from said primary power source when said reset circuit is receiving a sufficient amount of power from at least one of said primary and said secondary power sources to enable said reset circuit to reliably control said digital logic circuit.

30. The method of claim 29, wherein said selectively controlling step includes, during an initial power up stage, the steps of:

controlling said secondary power source to supply power to said reset circuit so that said reset circuit outputs a reset signal to said digital logic circuit; while preventing said primary power source from supplying power to said digital logic circuit and to said reset circuit.

31. The method of claim 30, further comprising the step of:

controlling said primary power source to supply power to said digital logic circuit and to said reset circuit after said reset circuit outputs said reset signal to said digital logic circuit.

32. The method of claim 29, wherein said selectively controlling step includes, during a power-down stage, the steps of:

stopping a supply of power from said primary power source to said digital logic circuit and to said reset circuit; while permitting said secondary power source to supply power to said reset circuit.

33. The method of claim 32, further comprising the step of stopping the supply of voltage from said secondary power source to said reset circuit after said supply of power from said primary source to said digital logic circuit and to said reset circuit is stopped.

* * * * *